Patented Oct. 28, 1941

2,260,889

UNITED STATES PATENT OFFICE 2,260,889

COATING COMPOSITION

Howard G. Donovan, Stelton, N. J., assignor to E. I. du Pont de Nemours & Company, Wilmington, Del., a corporation of Delaware No Drawing. Application April 17, 1939, Serial No. 268,383

2 Claims. (Cl. 260—16)

This invention relates to cellulose nitrate coating compositions, and more particularly to cellulose nitrate compositions especially adapted for finishing wood surfaces.

In the finishing of furniture, particularly school desks, office equipment and store fixtures, a high degree of scratch-resistance is essential. This property must be available at the least possible sacrifice in other finish properties including adhesion, durability, clarity, depth, resistance to cold-cracking, satisfactory working properties, print-resistance and general pleasing appearance. Improvements with respect to scratch-resistance, which can be defined as relative ability to withstand rupture from a blunt instrument such as the edge of a coin, in prior compositions have been obtained only at the expense of some other equally important property and therefore such products have been a compromise in which the real objective has not been achieved heretofore.

The present invention therefore has as a primary object the provision of a cellulose nitrate finish for wood surfaces which is characterized by an exceptionally high degree of scratch-resistance. Another object is the provision of a cellulose nitrate coating composition which when applied to wood surfaces affords a finish of excellent clarity, depth and generally pleasing appearance. A further object is the provision of a cellulose nitrate coating composition which affords satisfactory working properties when employed in finishing wood surfaces. A still further object of the invention is the provision of a cellulose nitrate coating composition which affords a finish of excellent adhesion, toughness and durability and which is resistant to cold-cracking and "printing." Other objects will appear as the description of the invention proceeds.

These objects are accomplished by means of compositions comprising definite proportions of cellulose nitrate and a specific oil modified alkyd resin and including also a suitable plasticizer.

The following examples, in which the parts are by weight, are illustrative of methods for practicing my invention:

Example I

| | |
|---|---:|
| Cellulose nitrate (½ sec. visc.) | 11.1 |
| Ethyl alcohol (denatured) | 6.0 |
| Toluol | 6.0 |
| Ethyl acetate | 6.0 |
| Isobutyl acetate | 6.0 |
| Do | 19.0 |
| Toluol | 14.7 |
| Ethyl acetate | 8.0 |
| Dibutyl phthalate | 2.8 |
| Castor oil | 1.5 |
| Synthetic resin solution A* | 16.2 |
| Synthetic resin B** | 2.7 |
| | 100.0 |

*The synthetic resin solution A of this example consists of equal parts of toluol and a resin dissolved therein which is a reaction product of:

| | |
|---|---:|
| Hydrogenated castor oil | 42.5 |
| Phthalic anhydride | 40.2 |
| Glycerine | 17.3 |
| | 100.0 |

This resin was prepared by the well-known fusion method which consists in heating all of the ingredients together at a temperature of about 392° F. until an acid number of about 50–55 is obtained. The charge is maintained in an atmosphere of an inert gas during manufacture. The resinous product is cooled slightly and cut with toluol to 50% solids.

The hydrogenated castor oil which was employed as an essential ingredient in preparing the above described resin was obtained by hydrogenating castor oil using a nickel catalyst at a temperature below 200° C. according to processes known in the art whereby the double bonds originally present in the castor oil are removed and the oil thereby completely hydrogenated. Reacting this product then with glycerine and phthalic anhydride affords a resinous product that is compatible with cellulose nitrate and when used in the range of proportions set forth below provides a new product with outstanding scratch-resistant properties.

**Synthetic resin B consists of a 28% non-drying vegetable oil acid modified alkyd resin.

The composition of Example I was manufactured by first mixing the first five ingredients as one portion and the remaining ingredients as a second portion and then combining these portions with simple agitator mixing to provide the final lacquer.

Three coats of this composition were sprayed on a wood panel and dried. The finish was tested for scratch-resistance by drawing the edge of a coin over the surface at a pressure such that caused severe rupture and marking white on the surface of a conventional cellulose nitrate finish. The results of this test indicated remarkable superiority of the new finish in scratch-resistance. Other properties required in a furniture finish were equivalent or superior to those normally obtained with previously available commercial compositions.

Example II

| | |
|---|---|
| Cellulose nitrate (½ sec. visc.) | 15.0 |
| Ethyl alcohol (denatured) | 8.1 |
| Toluol | 8.8 |
| Ethyl acetate | 8.0 |
| Isobutyl acetate | 8.0 |
| Do | 18.5 |
| Isobutyl alcohol | 3.6 |
| Toluol | 5.0 |
| Dibutyl phthalate | 3.0 |
| Castor oil | 3.8 |
| Synthetic resin solution A* | 18.2 |
| | 100.0 |

*The synthetic resin solution A employed in this example is of the same composition as that shown for Example I.

This lacquer was prepared by simple mixing technique involving the preparation of the two portions separately from the first five ingredients and from the remaining ingredients, as in Example I, by suitable agitation of the ingredients followed by combining the portions with agitator mixing to form the final lacquer.

The composition of this example was applied direct to wood brush handles by dipping. Three coats were applied in this manner. The finish thus obtained exhibited exceptional scratch-resistant properties while retaining all of the other requirements of a commercially acceptable wood finish.

Although it is preferred to employ cellulose nitrate of about ½ second viscosity characteristic (about 3 seconds as determined in accordance with A. S. T. M. specifications D—301—33, Formula B), cellulose nitrates of lower or higher viscosity characteristics, including all commercially available cellulose nitrates, may be used with suitable adjustments in the other ingredients of the composition involving particularly the plasticizer content, such variations being well understood in the art.

The resin ingredient of the compositions of the present invention should be modified with from not less than 40% to not more than 55% of hydrogenated castor oil. If the hydrogenated castor oil modifier is reduced substantially below 40%, the scratch-resistant properties are correspondingly reduced to such a point that the compositions are not markedly better than the more conventional products. On the other hand, if the hydrogenated castor oil modifier in the resin is increased substantially above 55%, "print" resistant properties are relatively poor and the finish therefore is of lessened practical significance.

Although phthalic anhydride is of the preferred acid radical in the resin ingredient of the new compositions, other acids such as succinic, maleic, adipic, sebacic, tartaric, citric and naphthalic may be substituted for the phthalic anhydride.

Suitable resins for the new compositions may also be prepared using other polyhydric alcohols including ethylene glycol and higher homologs; diethylene glycol and other polyglycols; polyglycerols; pentaerythritol and sorbitol.

It has been found that the proportion in the compositions of cellulose nitrate to hydrogenated castor oil modified alkyd resin should be such that the alkyd resin should not exceed an equal amount of cellulose nitrate since the inclusion of a greater proportion of the resin constituent tends to adversely affect "print" resistant properties. To obtain acceptable scratch-resistance, the resin proportion should not be less than about ½ the amount of cellulose nitrate.

Optimum conditions are obtained when the proportion of cellulose nitrate, modified alkyd resin and plasticizer is such that the composition contains for each 10 parts by weight of cellulose nitrate from 10 parts resin and 2 parts plasticizer to 5 parts of resin and 8 parts plasticizer.

The solvents and diluents shown in the examples are of course merely illustrative of a large number of such materials well known and widely used in the art, and many other equivalent materials may be satisfactorily substituted therefor. Suitable solvents and diluents include esters of lower fatty acids; for example, ethyl acetate, butyl acetate, amyl acetate, isobutyl acetate, butyl propionate and the like, ketones such as methyl ethyl ketone, alcohol ethers and their esters such as ethylene glycol monoethyl ether and ethylene glycol monomethyl ether acetate, lower aliphatic alcohols and aliphatic and aromatic hydrocarbon diluents such as petroleum naphtha and toluene.

It has been found that a substitution in part of the hydrogenated castor oil alkyd resin by other resins may be tolerated provided, however, that the alkyd resin is present in all cases in predominant proportions, preferably at least double the amount of substitute resin. Natural resins such as ester gum and damar, other synthetic resins including urea-formaldehyde and phenol-formaldehyde condensation products, toxilic acid modified rosin esters, vinyls, acrylic acid resins and other modified alkyds may be substituted in minor proportions for part of the preferred resin of the present invention. "Rezyl 19," a 28% vegetable oil acid modified alkyl resin, manufactured by American Cyanamid Corporation, has shown particular merit as a substitute in minor proportion for part of the hydrogenated castor oil alkyd resin employed as an essential ingredient in the present invention.

The dibutyl phthalate and castor oil softeners shown in the examples may be replaced, if desired, by other conventional softeners such as blown castor oil, ortho cresyl para toluene sulfonate, aryl sulfonamides including ortho, meta and para toluene ethyl sulfonamides and mixtures of these, xylene methyl sulfonamide, aryl and alkyl esters of phosphoric acid such as tricresyl, triphenyl and diethyl phosphates, diethyl phthalate and the phthalate esters of ether alcohols, such as the phthalate ester of ethylene glycol monomethyl ether.

The examples are illustrative of clear lacquer compositions but the use of the invention in the so-called "flat" lacquers is also contemplated. In this variation, suitable flatting agents such as silica gel, metal stearates (aluminum or zinc stearate), china clay, talc, magnesium carbonate, etc., may be included in compositions of the type shown in the examples.

The new compositions may be applied to wood surfaces by any convenient conventional manher such as by spraying, brushing or dipping. Best results are obtained when the compositions are applied directly to wood surfaces which may or may not be filled and stained, although the use of a conventional sealer as applied to the wood prior to application of the new scratch-resistant top coat is not precluded.

The products of the invention are particularly useful in finishing school furniture, office equipment and store fixtures where high scratch-resistance is of basic importance, but they are also of merit in the general finishing of wood surfaces since they possess all of the desired properties of a general utility wood finish with the added advantage of extraordinary scratch-resistance.

The primary advantage of the new compositions when applied to wood surfaces resides in the greatly superior scratch-resistance as can be readily demonstrated by drawing the edge of a coin over the finish and then over a conventional finish at the same pressure which causes a whitish scoring of the latter but which has substantially no effect on the surface of the improved finish. Excellent clarity, depth and generally pleasing appearance are obtained. The new finish lends itself readily to rubbing and polishing operations as practiced in the industry. The outstanding adhesion, toughness, durability and resistance to cold-cracking further extend the practical utility of the products of the invention which have already demonstrated their ability to meet the most stringent requirements and most severe service by their immediate and rapidly increasing commercial acceptance.

As many apparently widely different embodiments of this invention may be made without departing from the spirit and scope thereof, it is to be understood that I do not limit myself to the specific embodiments thereof except as defined in the appended claims.

I claim:

1. A scratch-resistant cellulose nitrate coating composition adapted for finishing wood surfaces comprising cellulose nitrate, a modified glyceryl phthalate resin the modifying agent of which consists essentially of from about 40 to 55% of completely hydrogenated castor oil, and a plasticizer, the proportion by weight of cellulose nitrate, resin and plasticizer being such that the composition contains for each 10 parts cellulose nitrate from 10 parts resin and 2 parts plasticizer to 5 parts of said resin and 8 parts plasticizer.

2. A scratch-resistant cellulose nitrate coating composition adapted for finishing wood surfaces comprising cellulose nitrate, a modified glyceryl phthalate resin the modifying agent of which consists essentially of about 45% of completely hydrogenated castor oil, and a plasticizer, in the proportion by weight of about 10 parts of cellulose nitrate, 10 parts of said resin and 4 parts of plasticizer.

HOWARD G. DONOVAN.